United States Patent Office 3,817,783
Patented June 18, 1974

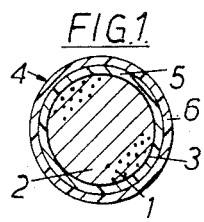
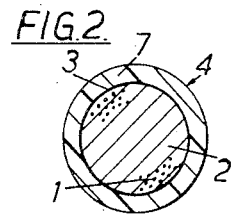
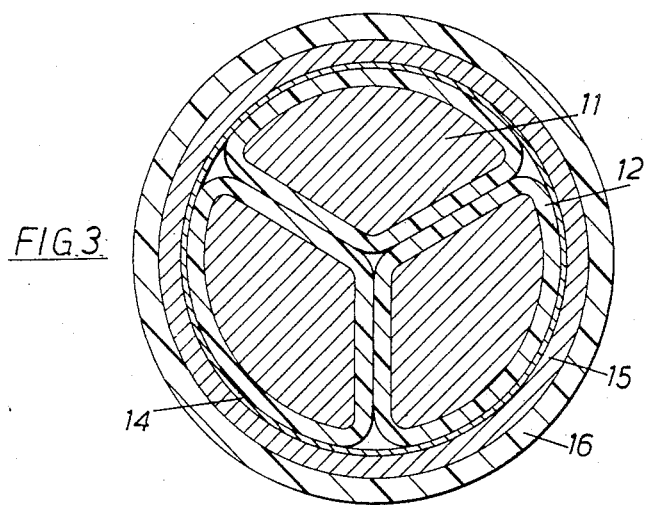
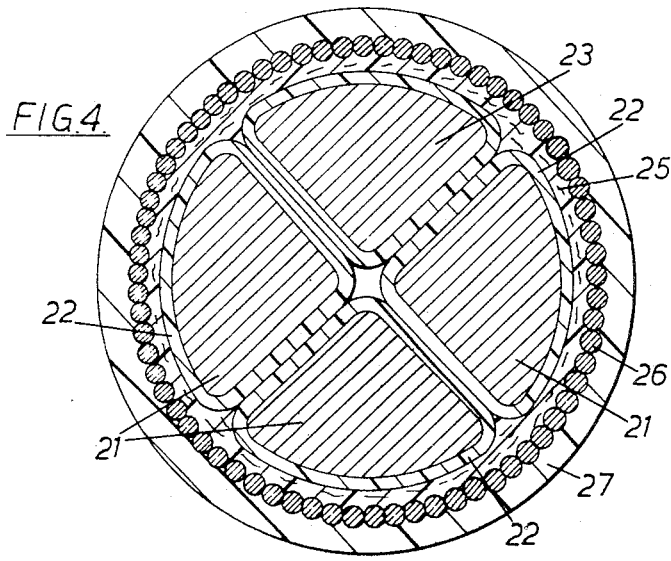

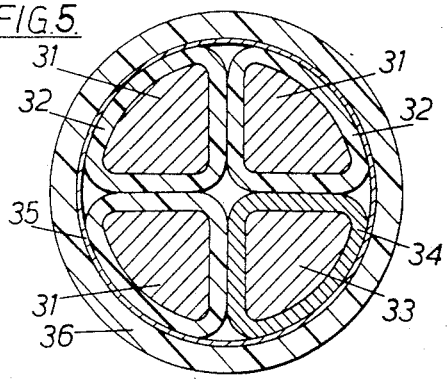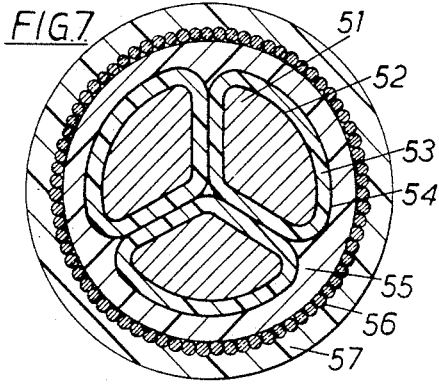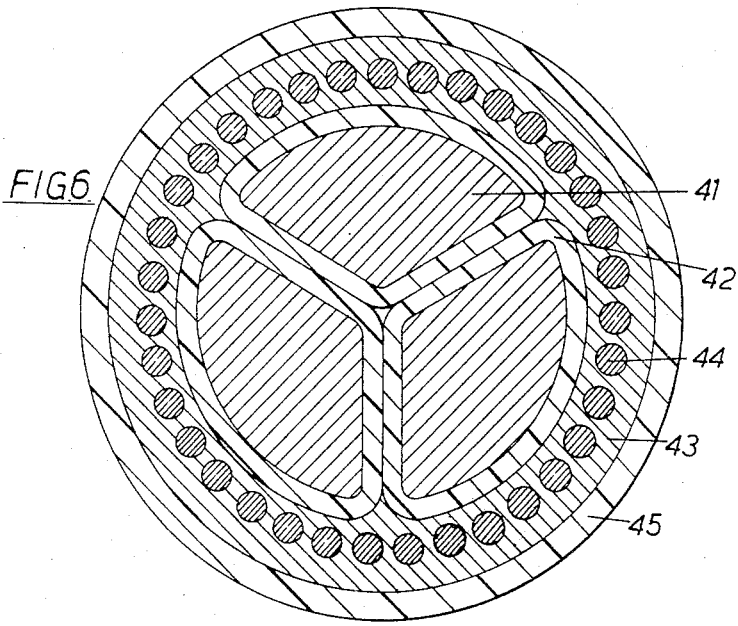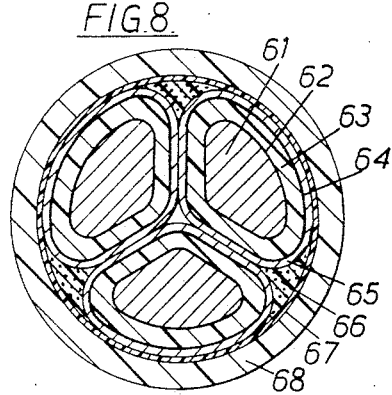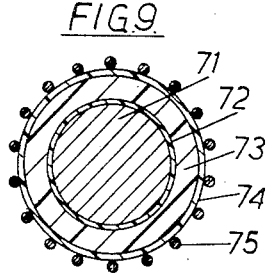

3,817,783
ELECTRIC CONDUCTOR
Stefan Verne, London, and Thomas Geoffrey Heggs, Welwyn, England, assignors to British Insulated Callender's Cables Limited, London, England
Original application Sept. 10, 1970, Ser. No. 70,987. Divided and this application June 21, 1972, Ser. No. 264,880
Claims priority, application Great Britain, Sept. 11, 1969, 45,000/69
Int. Cl. B44d 1/34; C09c 1/44
U.S. Cl. 117—226
7 Claims

ABSTRACT OF THE DISCLOSURE

An electric conductor is provided with an insulating covering of a polymeric composition which comprises a polymerised propylene sequence and a propylene/ethylene copolymer sequence, as a melt index (230° C.; 2.16 kgms.) of 0.01 to 0.5, preferably 0.025 and an ethylene content in the range 10–30% by weight, preferably at least 15% by weight. The invention also includes the insulated electric conductor which is provided with a dielectric screen material which is the polymeric composition containing between 20 and 40% by weight of carbon black.

---

This application is a division of our copending application, Ser. No. 70,987, filed Sept. 10, 1970.

This invention relates to olefine polymer compositions of propylene and ethylene and to the use of such compositions in electric cables.

Whilst the electrical properties of crystalline propylene/ethylene copolymers at present commercially available render these materials suitable for use in the manufacture of electric cables, especially as conductor insulation and/or sheathing, their excessive stiffness and excessive brittleness, especially at low and sub-zero temperatures, seriously limit their usefulness.

It is an object of the present invention to provide an improved crystalline propylene/ethylene copolymer having mechanical properties that render the material eminently suitable for use in electric cables operating over a wide temperature range.

According to the present invention there is provided a crystalline polymeric composition comprising at least one sequence of either propylene homopolymerised or of propylene copolymerised with up to 10% by weight of the composition of at least one other olefin monomer (which may be or may include ethylene), this sequence hereafter being referred to as the "propylene sequence," and at least a further sequence of propylene copolymerised with ethylene, this sequence hereafter being referred to as the "copolymer sequence," wherein said composition contains between 10 and 30% by weight of polymerised ethylene and has a melt flow index (measured by ASTM Test Method D1238–65T at 230° C. using a 2.16 kgm. weight) of between 0.01 and 0.5. The melt flow index of the polymeric composition is preferably between 0.025 and 0.25.

Preferably the composition comprises only one propylene sequence and only one copolymer sequence. The polymeric compositions may, however, comprise more than one of each sequence and in such a case the sequences will alternate with each other. The propylene sequence comprises the major part of the polymer composition and this sequence has a high softening temperature, comparable with that of crystalline polypropylene. The polymeric composition may contain sequences other than the propylene and copolymer sequences but these other sequences, for example a polyethylene sequence, may form only a minor part of the polymer composition and should not substantially affect the properties of the polymer composition as a whole. If the propylene sequence is a copolymer the amount of comonomer present should be sufficient to improve the flexibility of the sequence compared to crystalline polypropylene without producing a pronounced lowering of the softening temperature of the polymeric composition. The amount of comonomer present in this sequence will be dependent on the particular comonomer or comonomers, and thus, if ethylene is used, only a small quantity should be present, preferably not more than 3% of the total weight of the polymeric composition, whilst if a higher olefin monomer is used such as butene-1, up to 10% of the total weight of the polymeric composition may be copolymerised butene-1 without there being a significant effect on the softening temperature of the polymer composition.

The polymeric composition contains preferably at least 15% and particularly 25% by weight of polymerised ethylene. If both sequences contain ethylene, the total amount of ethylene should not exceed 30% by weight with no more than 3% by weight of ethylene being in the propylene sequence. It will be appreciated that a reference to a polymeric composition containing ethylene or another olefin should be understood to mean that the monomer is present in the polymerised and/or copolymerised form.

According to a further aspect of the present invention there is provided a process for the preparation of a polymeric composition using a sequential polymerisation technique wherein polymerisation is effected in at least two stages, using a polymerisation catalyst comprising titanium trichloride and an organo-aluminum compound, one of said stages being a polymerisation stage giving a propylene sequence as hereinbefore defined, the other of said stages being a copolymerisation stage giving a copolymer sequence as hereinbefore defined, the ethylene being polymerised in a quantity sufficient to produce a polymer composition containing 10–30% by weight of polymerised ethylene.

The titanium trichloride component of the catalyst can be any of the known forms of titanium trichloride. These include the product obtained by the reduction of titanium tetrachloride with hydrogen and the material described in British Pat. No. 877.050, which is the product obtained by the reduction of titanium tetrachloride with aluminium metal and which has the empirical formula $AlTi_3Cl_{12}$.

However, we prefer to use as the titanium trichloride component the product of the reduction of titanium tetrachloride by an aluminum dialkyl halide at a temperature between $-20°$ C. and $+20°$ C. We particularly prefer to use the product obtained by the gradual addition of an aluminum dialkyl halide to a stirred solution of titanium tetrachloride maintained at a temperature in the range $-20°$ C. to $+20°$ C., preferably 0° C. Using our particularly preferred titanium trichloride component together with a dialkyl aluminum halide as activator, it is possible to effect polymerisation using high concentrations of monomers without obtaining a thick intractable slurry which would be difficult to process further.

Optionally, hydrogen is present during the propylene sequence polymerisation stage. When hydrogen is used, it is present in a sufficient amount to produce a polymer composition having a melt flow index of 0.01 to 0.5 and we have found that polymer compositions having melt flow indices within the desired range can be obtained at 60° C. using 0.05 to 0.125 mole percent of hydrogen in the propylene. However at lower and higher temperatures, greater and smaller quantities respectively of hydrogen will be required to obtain the desired melt flow index. At 70° C., the amount of hydrogen which may be used is in the range 0.03 to 0.075 mole percent and at 53° C., the maximum amount of hydrogen is 0.16 mole percent. At lower temperatures such as 30° C. or even 20° C., the maximum amount of hydrogen to give the desired melt flow index is 0.27 or 0.33 mole percent respectively of hydrogen in the propylene.

When the polymerisation is complete, the catalyst is deactivated, for example by the addition of an alcohol, and removed from the polymer using well known conventional catalyst removal procedures, for example, washing the polymer with water, more alcohol or an inert hydrocarbon such as the polymerisation diluent. It is preferred in order to obtain good insulating properties, that the amount of residual catalyst is reduced to a low level.

Although the propylene sequence polymerisation stage and the copolymer sequence copolymerisation stage of the sequential polymerisation may, if desired, be repeated several times, we prefer to effect each stage once only.

The polymerisation can be effected by polymerising propylene, optionally together with another olefine monomer as the first stage, and then, before the propylene in the first stage is completely polymerised, introducing, as a single shot, ethylene for the second stage and thereafter copolymerising the ethylene and the propylene. The single shot of ethylene is in a sufficient amount to produce the desired quantity of polymerised ethylene in the final polymeric composition. Preferably the ethylene is introduced whilst there is a substantial quantity of propylene remaining, for example a partial pressure of propylene in excess of 0.5 atmospheres (0.53 kgm./sq. cm.). The ethylene is conveniently introduced when the partial pressure of propylene remaining is in the range 1.76 to 3.16 kgm./sq. cm.

Alternatively, the second stage can be effected using a mixed feed of ethylne and propylene rather than a single shot of ethylene, and this technique produces polymer compositions having improved toughness compared to compositions produced by the use of a single shot of ethylene and containing the same amount of polymerised ethylene in the final product.

The polymeric compositions in accordance with the invention are tough, even at low temperatures and have heat deformation characteristics that approach those of polypropylene. Furthermore, the flexibility of our polymeric compositions as indicated by the modulus of elasticity is similar to that of high density polyethylene having a density of approximately 0.95 g./cm.$^3$ and the compositions exhibit high resistance to environmental stress cracking. Furthermore, the high melting temperature of our polymeric compositions permits their use at high temperatures. When suitably stabilised they can be used at such high temperatures for an extended period of time even when in contact with air and in intimate contact with copper. For instance electric cables incorporating our compositions can be operated continuously at 90° C. for in excess of 20 years and would not be damaged at 145° for at least 1500 hours.

An additional advantage of our polymeric compositions is that they show much reduced voiding in slow cooled samples. Thus, if a sample of crystalline polypropylene is heated on a microscope slide, and cooled slowly from the melt, small voids can be observed to form between the spherulites, whereas the polymeric compositions of the present invention show little or no voiding under the same conditions.

The mechanical properties of our polymeric compositions are combined with chemical inertness and a high degree of resistance to many environments including those in which fungi and bacteria are present and a high degree of resistance to insects such as termites. The polymeric compositions also have a high resistance to cutting, crushing and abrasion over a wide range of temperatures.

A further advantage of our polymeric compositions is that they will accept a higher loading of compounding ingredients, such as carbon black, than crystalline polypropylene.

Thus, as a further aspect of the present invention, there is provided a semi-conductive composition comprising the polymeric composition in accordance with the invention containing conductive carbon black.

This composition is suitable for use in forming a semiconducting conductor and/or dielectric screen on an electric cable. It is preferred that the content of carbon is at least 20% by weight in order to obtain a sufficient conductivity but normally not more than 40% by weight and we have found that with 25 to 30% by weight of conductive carbon black a satisfactory conductivity is obtained without the mechanical properties of the polymeric composition being unacceptably affected. For these semi-conducting compositions it is preferred to use polymeric compositions containing 25%, or more, by weight of ethylene.

The combination of properties possessed by our polymeric compositions render them especially suitable for use in the manufacture of insulated electric conductors and cables and also for use as a semi-conducting screen in cables.

The various forms of cables and conductors in which the polymer compositions may be used include low and medium voltage and super-tension power cables, control cables and covered wires, mineral insulated cables, pilot and telecommunication cables and radio and higher frequency cables. In addition to their use in cables and cable accessories, the mechanical and electrical properties of the polymeric compositions and the ease with which they can be extruded or otherwise processed render the materials useful for other electrical applications, for instance for insulating motor windings especially submersible pump motor windings.

Accordingly, the invention also includes an electric conductor having at least one insulating covering of solid, laminated or cellular form which covering is formed of a polymeric composition in accordance with the present invention. The invention includes an electric cable comprising a plurality of such insulated conductors.

The invention further includes a single or multicore electric cable comprising an insulated conductor or a plurality of insulated conductors enclosed in a sheath of the polymeric composition of the present invention, the insulation of the conductors may also be made of the polymeric composition of the invention.

The invention also includes a single or multicore electric cable in which the or each core include a conductor and/or dielectric screen comprising a layer of a semi-conductive polymeric composition of the present invention containing conductive carbon black.

The polymeric compositions of the present invention can be applied to a conductor or core by extrusion over a wide range of wall thicknesses and can be successfully applied to both round and shaped conductors and to solid and corrugated metal sheaths, the technique employed being similar to that employed when extruding polyethylene. Insignia can be embossed on coverings of the polymeric composition using the technique hitherto employed when embossing polyethylene.

The improved mechanical properties of the polymeric compositions of the present invention will be further illustrated, by way of example, by the following test results that were obtained in testing two commercial grades of crystalline propylene/ethylene copolymers, designated A and B, copolymer A being a high molecular weight extrusion grade material containing about 8% by weight of polymerized ethylene and copolymer B being an injection moulding grade material, containing about 15% by weight of polymerized ethylene, and four polymeric compositions, C, D, E and F in accordance with the present invention.

EXAMPLE 1

Preparation of polymeric composition C 70 l. of a dry aliphatic hydrocarbon diluent boiling point 100–180° C. were added to a stirred jacketed stainless steel autoclave. All air was removed by evacuation and the system was purged with a stream of propylene for 5 minutes, 0.7 mole of diethyl aluminium chloride (dissolved in hydrocarbon solvent) was then added to the autoclave, followed by 0.42 mole of $TiCl_3$ by reducing $TiCl_4$ with aluminium alkyl chlorides as in British Pat. No. 1,014,944.

The reactor was heated to 60° C. and 22.5 kg. of propylene containing 0.06 mole percent of hydrogen were added over a period of 3 hours. After this, the autogeneous pressure was allowed to fall until the propylene partial pressure was 35 p.s.i.a. At this point 7.5 kg. of ethylene were added over a period of 2 hours. Then the slurry was quenched with isopropanol, and catalyst residues were extracted in the normal fashion by continued washing with water. The polymeric composition was filtered and dried to yield 28 kg. of powder, having a polymerised ethylene content of 25% by weight. This was densified in an extruder using 1,1,3-tris-(2'-methyl-5'-tert-butyl 4'-hydroxyphenyl) butane and dilauryl thiodipropionate as stabilisers.

EXAMPLE 2

Preparation of polymeric composition D

A polymeric composition was prepared as in Example 1 except that the hydrogen concentration in propylene was 0.10 mole percent. The polymeric composition contained 25% by weight of polymerised ethylene.

EXAMPLE 3

Preparation of polymeric composition E

A polymeric composition was prepared, as in Example 1, except that 25.5 kg. of propylene were charged initially, followed by a 4.5 kg. of ethylene. The polymeric composition contained 15% by weight of polymerised ethylene.

EXAMPLE 4

Preparation of polymeric composition F

Diluent, catalyst aluminium alkyl were charged into an autoclave, as in Example 1. 25.5 kg. of propylene containing 0.05 mole percent of hydrogen were added over a period of 3 hours. Then the autoclave was cooled to 50° C. and propylene allowed to polymerise until its partial pressure in the reactor was 20 p.s.i.a. At this point 4.5 kg. of ethylene were added over a period of 2 hours. After feeding 0.6 kg. of ethylene, a continuous feed of propylene was also introduced at the rate of 2.3 kg./hr. After feeding all the ethylene, the reaction was quenched with isopropanol and worked up as in Example 1. The polymeric composition contained 15% by weight of polymerised ethylene.

A series of test specimens were prepared from polymeric compositions A to F by compression moulding granules of the compositions using a temperature of 200° C. for all polymeric compositions except composition A for which a temperature of 225° C. was used, a pressure of 1100 p.s.i. for 0.25 inch thick samples or 630 p.s.i. for 0.125 inch thick samples and a moulding time of 10 minutes.

The samples were then either fast cooled by transferring to a press heated to 160° C. and cooling by circulating cold water through the press (to give a cooling time of 5–10 minutes) or slow cooled by leaving in the press and allowing to cool naturally, taking approximately 6 hours to cool from 200° C. to 60° C.

The samples were then subjected to a series of tests to determine their mechanical properties. The results obtained with the fast cooled specimens are set out in Table I and with the slow cooled specimens in Table II. In Table III are set out the environmental stress cracking results obtained with both slow and fast cooled specimens. In Tables I and III results obtained on samples of high density polyethylene (HDPE) are also given by way of a further comparison.

TABLE I.—FAST COOLED MOULDINGS

| Property | Polymer | | | | | | |
|---|---|---|---|---|---|---|---|
| | A | B | C | D | E | F | HDPE |
| Melt flow index (ASTM D 1238 65T) | 0.4 | 1.4 | 0.05 | 0.16 | 0.18 | 0.19 | |
| Softening point (° C.) 0.1 inch penetration 5 kg./cm.$^3$ load | 165.5 | 167.5 | 165 | 164 | 165 | 165 | 129 |
| Vicat softening point BS 2782 but heating rate 120° C./hr | 147 (143) | 138 | 129.5 | | 135 | 135 | |
| Izod notched impact strength ft./lb./in. notch ASTM D 256-56 Method A: | | | | | | | |
| 23° C | 8.0 | 1.1 | >15 | >15 | >15 | >15 | 2.3 |
| 0° C | 0.8 | 1.5 | | | 9.4 | | |
| −7° C | | | 16 | 13.4 | 4.8 | 14.6 | |
| −12° C | | | 11 | 8.3 | 1.9 | 9 | |
| −18° C | | | 3.4 | 2.3 | | 7.7 | |
| Notched Charpy impact** (ft. lb./in. at 0° C.) | 0.26 | 0.21 | 2.05 | 1.62 | 1.68 | 1.97 | |
| Cold shatter test+ T50 temperature* (° C.) | −23 | | −66 | −61 | −45 | −57 | |
| Low temp. brittle point, ° C. ASTM D 746* | −29 | −39 | −70 | −66 | −47 | −58 | |
| Tensile properties: | | | | | | | |
| Yield stress (lb./in.$^2$): | | | | | | | |
| 2 inches/min./inch | 3,800 | 3,200 | 2,750 | 2,450 | 3,000 | 2,600 | 2,900 |
| 20 inches/min./inch | 4,400 | 3,400 | 3,000 | 2,900 | 3,100 | 2,650 | 3,200 |
| Break stress (lb./in.$^2$): | | | | | | | |
| 2 inches/min./inch | 5,700 | 4,200 | 4,200 | 3,700 | 5,300 | 5,000 | |
| 20 inches/min./inch | 3,500 | 2,650 | 2,800 | 2,000 | 2,950 | 3,000 | |
| Elongation at break (percent): | | | | | | | |
| 2 inches/min./inch | 780 | 670 | 600 | 570 | 770 | 740 | >800 |
| 20 inches/min./inch | 740 | 170 | 520 | 410 | 720 | 610 | >800 |
| 1% secant flexural modulus (lb./in.$^2$) ASTM D 790-66 | 169,000 | 163,000 | 113,000 | 128,000 | 133,000 | 118,000 | 130,000 |

*Specimens and specimen holder modified as in ASTM Bulletin No. 231, July 1958. The samples fit in the standard D 764 equipment since only 15 specimens are loaded into the small holder.
*T50=Temperature for 50% cold shatter failure.
+ The specimen (5.5 x 0.2 x 0.125 ins.), resting symmetrically on supports 2 inches apart in a thermostated alcohol bath was struck at its midpoint by a 1 lb. wedge-shaped tup falling from a height of 24 inches. Multiple specimens were tested at several temperatures in the range of 0 to −70° C. and the fraction of specimens which failed to break was recorded and expressed as "percentage pass." The temperature for 50% pass was determined from a plot of percentage pass (on a log probability scale) against temperature.
**The Charpy impact properties were measured using a Hounsfield plastics impact tester manufactured by Tensometer Limited, Croydon, to determine the Charpy impact strength (N.I.S.). In this impact strength test a specimen of length 2 inches, width 0.25 inch and thickness 0.125 inch having a V-shaped notch 0.11 inch deep with a tip radius of 0.01 inch cut in the middle of one of the 2 inch x 0.25 inch sides, is supported at each end with its major axis at right angles to the path of a small pendulum in such a position that the pendulum at the lowest point of its path strikes the specimen at a velocity of 8 ft./second on the side opposite the notch and at a point directly behind it. The ends of the specimen are not clamped, but rest on two horizontal surfaces with the ends of the notched edge against rigid vertical stops. The average energy absorbed by 10 specimens is recorded.

TABLE II.—SLOW COOLED MOULDINGS

| Property | Polymer | | | | | |
|---|---|---|---|---|---|---|
| | A | B | C | D | E | F |
| Melt flow index (230° C./2.16 kg. load) | 0.4 | 1.4 | 0.05 | 0.10 | 0.18 | 0.19 |
| Izod notched strength (lb./inch notch), D 256-56, Method A: | | | | | | |
| 23° C | 6.7 | 3.1 | | >16 | | |
| 0° C | 1.1 | | | 11.0 | 7.0 | |
| −8.5° C | | | 9.0 | 5.0 | 3.5 | 10.0 |
| −13° C | | | 7.5 | 3.8 | 2.8 | 6.1 |
| −19° C | | | 3.2 | 3.2 | 2.2 | 3.8 |
| Cold shatter test $T_{50}$ temperature* (° C.) | −14 | | −65 | −70 | −47 | −59 |
| Tensile properties: | | | | | | |
| Yield stress (lb./in.): | | | | | | |
| 2 inches/min./inch | 3,600 | 3,300 | 2,800 | 2,450 | 3,000 | 2,650 |
| 20 inches/min./inch | 4,600 | 3,500 | 3,500 | 3,100 | 3,500 | 3,200 |
| Break stress (lb./in.): | | | | | | |
| 2 inches/min./inch | 5,200 | 3,300 | 3,400 | 2,600 | 4,300 | 4,500 |
| 20 inches/min./inch | 3,300 | 3,450 | 3,100 | 3,000 | 2,950 | 3,200 |
| Elongation at break (percent): | | | | | | |
| 2 inches/min./inch | 720 | 100 | 330 | 140 | 600 | 600 |
| 20 inches/min./inch | 100 | 80 | 160 | 100 | 200 | 540 |

*$T_{50}$=Temperature for 50% cold shatter failure.

TABLE III.—ENVIRONMENTAL STRESS CRACKING (ASTM D 1693 procedure using 0.060 inch thick specimens)

| Material | C.6 cable oil | | Environment at 65° C.—Lissapol N | | | | | |
|---|---|---|---|---|---|---|---|---|
| | $F_{(0)}$ | (Hours) | $F_{(0)}$ | (Hours) | $F_{50}$ | (Hours) | $F_{100}$ | (Hours) |
| A—Fast cooled | >4,000 | (0/10) | 300 | (1/20) | 500 | (10/20) | 800 | (20/20) |
| A—Slow cooled | >4,000 | (0/10) | 1,300 | (1/10) | 2,000 | (5/10) | 2,200 | (10/10) |
| C—Fast cooled | >4,000 | (0/10) | >4,000 | (0/10) | | | | |
| C—Slow cooled | >4,000 | (0/10) | 3,000 | (1/10) | >4,000 | (2/10) | | |
| D—Fast cooled | >4,000 | (0/10) | 2,000 | (1/10) | >4,000 | (1/10) | | |
| D—Slow cooled | >4,000 | (0/10) | 3,500 | (1/10) | >4,000 | (1/10) | | |
| E—Fast cooled | >4,000 | (0/10) | >4,000 | (0/10) | | | | |
| E—Slow cooled | >4,000 | (0/10) | >4,000 | (0/10) | | | | |
| F—Fast cooled | >4,000 | (0/10) | 1,500 | (1/10) | >4,000 | (3/10) | | |
| F—Slow cooled | >4,000 | (0/10) | 3,500 | (1/10) | >4,000 | (2/10) | | |
| High density polyethylene (fast cooled) | | | 210 | (1/20) | 440 | (10/20) | >500 | (13/20) |

NOTE.—$F_{(0)}$, $F_{50}$ and $F_{100}$ refer to times to the first, 50% and 100% failures respectively. The figures in parentheses give the proportion of failures at the times shown. C.6 cable oil is a low viscosity hydrocarbon cable oil sold by Dusseks Ltd.

The advantages provided by the polymeric compositions of the present invention are apparent from Tables I to III. The mechanical properties of polymeric compositions C, D, E and F are superior to those of the conventional copolymers A and B, especially with regard to the low temperature Izod impact strength and cold shatter tests on both slow and fast cooled mouldings. In fact polymeric compositions C, D and F are tougher at −18° C. than high density polyethylene at room temperature whereas most crystalline polypropylenes at present commercially available become brittle at 0° C.

All of the polymeric compositions C to F are more flexible than copolymers A and B and composition C is in fact marginally more flexible than high density polyethylene. The increase in flexibility of polymeric compositions C to F as compared with copolymers A and B has been achieved without a significant reduction in the softening points of the compositions, the softening points being approximately 50° C. higher than that of low density polyethylene and about 35° C. higher than that of high density polyethylene. We have found that suitably stabilised polymeric compositions in accordance with the invention can be used continuously at 90° C. and for limited periods of time can be used at much higher temperatures, for instance for at least 1500 hours at 145° C.

In addition to the improved mechanical properties discussed above we have found that, unlike low and high density polyethylenes and commercially available polypropylenes the polymeric compositions of the present invention show an extremely high resistance to environmental stress cracking as illustrated by Table III. Unlike high density polyethylenes they also show no thermal cracking.

It will be observed that copolymer B has the same ethylene content as polymeric compositions E and F but is less tough than compositions E and F. Furthermore, copolymer B is more liable to the formation of voids than either of compositions E and F. Equally, copolymer A, although having a melt flow index as specified for our polymeric compositions, is also less tough than composition C, D, E or F. Thus, the particular combination of properties possessed by compositions C, D, E and F is dependent on the polymeric compositions having an ethylene content and melt flow index within the specified range, materials having a lower ethylene content or higher melt flow index not possessing the desirable combination of properties possessed by our polymeric compositions which makes them particularly suitable for use in cables.

Of the polymeric compositions C, D, E and F, composition C possesses a particularly desirable combination of mechanical properties, toughness and flexibility.

The invention is further illustrated, by way of example, by details of our preferred semi-conducting polymeric composition in accordance with the invention and by descriptions of five forms of electric cable in which use is made of polymeric compositions in accordance with the invention.

EXAMPLE 5

A semi-conducting composition was prepared consisting of 72 parts by weight of the polymeric composition C containing N-salicylidene-N'-salicylhydrazide as copper inhibitor and anti-oxidants and 28 parts by weight of a conductive carbon black sold by Cabot Carbon Co. under the name of "Vulcan" XC72. The anti-oxidants were those used in Example 1.

The composition had the following properties:

Melt flow index (230° C./10 kgm. load) _____ 0.098
Tensile properties at extension rate of 200% per minute:
    Yield stress _____kgf./cm.$^2$__ 245
    Yield extension _____percent__ 11.5
    Elongation at break _____do____ 380
    D.C. resistivity (B.S. 2044) _____ohm.cm__ 7

When a similar semi-conducting composition was prepared using polymer A instead of the polymeric composition C, the elongation at break was less than 10%.

EXAMPLE 6

A 660/1100 volt power cable was made consisting essentially of three 194 mm.$^2$ (0.3 sq. in.), 120° sector shaped solid aluminium conductors insulated with a 0.9 mm. (0.036 in.) radial thickness of impregnated paper. The three laid up cores were enveloped by an aluminium tube of about 2.0 mm. (0.08 in.) radial thickness performing the dual function of a neutral conductor and sheath. The outer surface of the concentric neutral conductor was treated with a suspension of zinc chromate in bitumen and the following protective layers were supplied by extrusion to four separate lengths of the cable: (i) a plasticised PVC of a grade typical of those used for cable sheathing; (ii) a high density polyethylene ("Hostalen" GM–5010, sold by Hoechst); (iii) a polypropylene copolymer ("Propathene" HPE–103, sold by ICI) and (iv) polymeric composition C in accordance with the present invention containing additives for protection against oxidative ageing and effect of sunlight. In each case the thickness of the extruded oversheath was 2.5±0.2 mm. (0.099±0.008 in.) and the outer diameter about 42 mm. (1.65 in.). The effectiveness of the protection given by the four materials is illustrated by the test results in Table IV. The results show the unique combination of properties of the sheath of the polymeric composition of the present invention; absence of brittleness at −20° C. combined with high resistance to cut propagation, abrasion, cutting and crushing.

TABLE IV

| Test | PVC | High density polyethylene | Polymer C | Polypropylene |
|---|---|---|---|---|
| Resistance to cutting (1) at— | | | | |
| 23° C. (kg.) | 74 | 500 | 500 | 500 |
| 65° C. (kg.) | 29 | 315 | 500 | 500 |
| Resistance to crushing (2) at— | | | | |
| 23° C. (kg.) | 1,750 | >5,000 | >5,000 | >5,000 |
| 65° C. (kg.) | 640 | 2,300 | >5,000 | >5,000 |
| Temperature of brittle failure under impact (3) $T_{ie}$ ° C. | −5 | 20 | −30 | −10 |
| Resistance to abrasion (4) number of cutter revolutions | 14 | 300 | 300 | 300 |
| Resistance to cut propagation at 65° C. (5) | Pass | Fail | Pass | Marginal |

The methods of test referred to in Table IV were carried out in the following manner.

(1) Resistance to cutting.—A 30° wedge, carrying 0.8 mm. (0.032 in.) wire on cutting edge, was advanced at 0.05 mm./min. (0.002 in./min.) against the cable sample supported on a flat anvil in a water-bath. The force on the wedge was recorded when the wedge made electrical contact with the aluminium outer (concentric neutral) conductor.

(2) Resistance to crushing.—A horizontal semi-cylindrical edge was advanced at 10 mm./min. (0.394 in./min.) against a cable sample supported on a semi-cylindrical anvil. The two semi-cylindrical tools were of approximately the same diameter as the cable, and were advanced with their axes parallel to one another and normal to the cable axis. Failure was detected electrically.

(3) Temperature of brittle failure under impact.—A horizontal semi-cylindrical striker of approximately the same diameter as the cable was loaded to 100 kg. (220 lbs.) and was dropped from 1.5 metre (4.92 ft.) on to a cable sample pre-cooled to a specified temperature. The sample was supported on a flat anvil.

(4) Resistance to abrasion.—The resistance to abrasion was measured at room temperature, against a milling cutter with 16 teeth, ground back to angles of 60° and 20° to a tangent. A load of 50 kg. (110 lb.) was applied in a direction normal to the axis of the cutter which was caused to rotate at a peripheral speed of 25 mm./sec. (0.984 in./sec.). The number of cutter revolutions required for the cutter to wear through to the outer conductor was measured.

(5) Resistance to cut propagation.—A circumferential cut, 1.25 mm. (0.05 in.) deep, was made in the cable sample by a suitably mounted razor blade. The sample was then bent to fit a former of 45 cm. (17.7 in.) radius and immersed in water and was subjected to 21 daily temperature cycles of 16 hours at 70° C. and 8 hours at 23° C.

EXAMPLE 7

A 20 pair telephone distribution cable was made containing 40 copper conductors, each of 0.9 mm. (0.036 in.) diameter and insulated with 0.3 mm. (0.012 in.) radial thickness of a conventional low density polyethylene. One length of this cable was sheathed with 3 mm. (0.118 in.) radial thickness of a conventional low density polyethylene and another with the same thickness of polymeric composition C in accordance with the invention containing additives for protection against sunlight and oxidative ageing. A test, carried out to assess the degree of protection against damage, consisted of laying a sample of cable on a "typical bed" (i.e. compressed sand) and dropping a spade, loaded to 45.34 kg. (100 lb.) from predetermined heights. When the spade was dropped from a height of 191 mm. (7.5 in.), the length sheathed with polyethylene was severely damaged with the sheath cut and some conductors severed. The length sheathed with the polymeric composition C withstood the spade being dropped from 254 mm. (10 in.) without either the sheath or conductors being cut; when the spade was dropped from 356 mm. (14 in.), the conductors were still unbroken although the sheath was cut. Hitherto, cables of this type have been protected by steel armour in order to achieve resistance to cutting by a spade dropped from a height of 191 mm. (7.5 in.).

EXAMPLE 8

An 11,000 volt power cable consisted essentially of three 185 mm.$^2$ (0.286 sq. in.) circular stranded aluminium conductors, each covered with successive layers of semi-conductive screen, insulation and dielectric screen. The construction of the cable is as follows:

| | |
|---|---|
| Conductor diameter | 17.6 mm. (0.020 in.). |
| Semi-conducting screen of Example 5, thickness. | 0.5 mm. (0.020 in.). |
| Insulation (polymeric composition C compounded with antioxidants and a copper inhibitor), thickness. | 3.4 mm. (0.134 in.). |
| Semi-conducting screen of Example 5, thickness. | 0.7 mm. (0.028 in.). |
| Core diameter | 26.8 mm. (1.055 in.). |
| Laid-up cores diameter | 58.5 mm. (2.3 in.). |
| Binder thickness (polypropylene tape) | 1.0 mm. (0.039 in.). |
| 2 copper tapes 0.0762 mm. (0.003 in.) thick, 40 mm. (1.575 in.) wide applied with 50% overlap. | |
| Diameter over copper tapes | 59.8 mm. (2.36 in.). |
| Oversheath (polymeric composition C stabilised against deleterious effect of sunlight and compounded with antioxidants and a copper inhibitor), thickness. | 2.8 mm. (0.110 in.). |
| Oversheath diameter | 65.4 mm. (2.58 in.). |

The conductor screen, insulation and dielectric screen were applied to each conductor by extrusion in such a way that a strong continuous uninterrupted bond exists on the interfaces between the insulation and the two semi-conducting screens.

In Examples 6, 7 and 8 the composition C contained the same copper stabiliser and antioxidants as in Example 5 and also contained 2½% of carbon black as protection against the effect of sunlight.

EXAMPLE 9

The crystalline propylene/ethylene copolymer of the present invention, for instance polymeric composition C, is used as the solid plastics dielectric of the or each core of a high voltage electric power cable for installation in a system in which during operation of the cable the plastics dielectric is subjected to a pressure above atmospheric by a cable gas, such as nitrogen or sulphur hexafluoride, which has access to one or more surfaces of the dielectric. The copolymer of the dielectric is impregnated with a cable gas to an extent such that, until the cable is put into service, at least the major part of the solid dielectric remains fully impregnated with the gas, that is to say any void in the dielectric or between the dielectric and a conductive body bonded thereto, is filled with the cable gas at a pressure of at least 15 lbs./sq. in., preferably at least 30 lbs./sq. in.

EXAMPLE 10

A mineral insulated cable comprising one or more conductors insulated from each other and from an aluminium sheath by compacted magnesium oxide has an oversheath of polymeric composition C compounded with antioxidants and preferably but not necessarily containing 2½ % of carbon black as protection against the effect of sunlight to protect the aluminium sheath against corrosion.

Use of the polymeric compositions of the present invention in insulated electric conductors and cables will be further illustrated by descriptions, by way of example and with reference to the accompanying drawings which show cross-sectional views of various forms of electric cable incorporating the polymeric compositions as conductor insulation, as semi-conducting screens and/or as cable sheaths. In the accompanying drawings:

FIGS. 1 and 2 show two forms of telephone distribution cable;

FIGS. 3, 4, 5 and 6 show four forms of low voltage power cable;

FIGS. 7 and 8 show two forms of medium voltage power cable, and

FIG. 9 shows a single core medium voltage cable.

The telephone cables shown in FIGS. 1 and 2 each comprise a multiplicity of plastics insulated conductors 1, surrounded by one or more layers 3 of helically lapped paper tape and enclosed by an outer protective sheath 4. The interstices between the insulated conductors 1 and between them and the layers 3 of paper tape are preferably filled with a water-impermeable medium such as petroleum jelly compound 2 which also impregnates the paper tape. In the telephone cable shown in FIG. 1 the sheath 4 is of composite form comprising an inner layer 5 of polyethylene and an outer layer 6 of a crystalline propylene/ethylene copolymer in accordance with the invention, such as polymeric composition C. The sheath 4 of the telephone cable shown in FIG. 2 comprises a single extruded layer 7 of the crystalline propylene/ethylene copolymer. In each cable the plastics insulation of the conductors may be made of a crystalline propylene/ethylene copolymer or it may be of another polymeric material such as polyethylene; the conductor insulation may be of solid or cellular form. If desired the layers of impregnated paper tape may be replaced by a layer of longitudinally applied aluminium tape having at least on its outer surface a coating of polyethylene.

The low voltage power cable shown in FIG. 3 consists essentially of three sector-shaped solid aluminium conductors 11, each covered by a layer of insulation 12, to form three insulated cores. The three cores are laid up together and are surrounded by one or more layers 14 of binding tape, an extruded aluminium sheath 15 and an outer sheath 16 of a crystalline propylene/ethylene copolymer in accordance with the invention such as polymeric composition C. The insulation 12 of each conductor may be an extruded layer of a crystalline propylene/ ethylene copolymer or of another polymeric material or it may comprise layers of helically lapped impregnated paper tape.

An alternative form of low voltage power cable shown in FIG. 4 comprises four sector shaped solid aluminium conductors, three of the conductors 21 constituting the power conductors and the fourth conductor 23 constituting the neutral conductor. Each conductor is covered by an extruded layer 22 of insulation. The four cores are laid up together and surrounded by a bedding 25 for a layer of armouring 26, which may comprise helically lapped steel wire or aluminium strip, and an outer sheath 27 of a crystalline propylene/ethylene copolymer of the present invention such as polymeric composition C. As in the example shown in FIG. 3 the insulation 22 of the conductors 21 and 23 may be of a crystalline propylene/ethylene copolymer or of another polymeric material.

FIG. 5 shows a low voltage power cable comprising three solid aluminium power conductors 31, each insulated with an extruded layer 32 of a crystalline propylene/ ethylene copolymer of the present invention, and a solid aluminium neutral conductor 33 enclosed in a covering 34 of extruded lead. The four cores are laid up together and are surrounded by one or more layers 35 of helically lapped steel tape and an outer protective sheath 36, of polymeric composition C.

The low voltage cable shown in FIG. 6 comprises three sector shaped solid aluminium power conductors 41 each insulated with a layer 42 of polymeric composition C. The three cores are laid up together and are surrounded by a concentric neutral conductor 44 of stranded aluminium wires, the direction of lay of which is reversed at intervals along the length of the cable, which is embedded in anti-corrosion bedding 43. The assembly is enclosed in a sheath 45 of polymeric composition C.

FIG. 7 shows an 11,000 volt power cable consisting essentially of three 185 mm.² (0.286 sq. in.) sector shaped solid aluminium conductors 51 each covered with successive layers of semi-conductive screen 52 insulation 53 and dielectric screen 54. The construction of the cable is as follows:

| | |
|---|---|
| Semi-conducting screen 52 of Example 5 thickness. | 0.5 mm. (0.020 in.). |
| Insulation 53 (polymeric composition C compounded with anti-oxidants and a copper inhibibitor), thickness. | 3.4 mm. (0.134 in.). |
| Semi-conducting screen 54 of Example 5, thickness. | 0.5 mm. (0.020 in.). |
| Laid up cores diameter | 46.1 mm. (1.82 in.). |
| Bedding 55 of semi-conducting rubber-like material, overall diameter. | 48.1 mm. (1.89 in.). |
| Armouring layer 56 of helically wound steel wires (2.5 mm. (.099 in.) in diameter). Diameter over armouring. | 53.1 mm. (2.01 in.). |
| Sheath 57 (polymeric composition C stabilised against deleterious effect of sunlight and compounded with anti-oxidants and a copper inhibitor) thickness. | 2.2 mm. (0.087 in.). |
| Overall diameter | 57.94 mm. (2.28 in.). |

The medium voltage power cable shown in FIG. 8 comprises three solid aluminium power conductors 61 each surrounded by a semi-conducting screen 62 of the composition described in Example 5, an insulating layer 63 of polymeric composition C and a semi-conducting screen 64 of the same composition as the screen 62. The conductor screen 62, insulation 63 and dielectric screen 64 are so extruded that a strong continuous uninterrupted bond exists between their interfaces. Each core so formed is surrounded by a screen formed by one or more layers 65 of helically lapped copper tape. The three screened cores are laid up together with fillers 66 and are bound by a helical lapping 67 of insulating tape. A sheath 68 of polymeric composition C surrounds the assembly of cores.

FIG. 9 shows a single core power cable comprising a solid aluminium conductor 71, a conductor screen 72 formed by an extruded layer of the semi-conducting polymeric composition described in Example 5, an extruded layer 73 of polymeric composition C constituting the conductor insulation, a dielectric screen 74 of the same material as the conductor screen 72 and a layer 75 of stranded tinned copper wires.

Although in each of the cables described with reference to FIGS. 3 to 9 the core conductors are described as solid aluminium conductors each may alternatively be formed of stranded aluminium or copper wires.

We claim:

1. An electric conductor having an insulating covering formed of a crystalline polymeric composition comprising at least one sequence of either homopolymerised propylene or of propylene copolymerised with up to 10% by weight of the composition of at least one other olefin monomer and at least a further sequence of propylene copolymerised with ethylene wherein said composition contains between 10 and 30% by weight of polymerised ethylene and has a melt flow index of between 0.01 and 0.5.

2. An electric conductor as claimed in claim 1, wherein the polymeric composition has a melt flow index of between 0.025 and 0.25 and an ethylene content of at least 15% by weight.

3. An electric conductor as claimed in claim 1, wherein the insulating covering is of cellular form.

4. An electric conductor as claimed in claim 1, wherein the insulating covering is of laminated form.

5. The electric conductor of claim 1 wherein the olefin monomer is ethylene.

6. An electric conductor as claimed in claim 1, wherein the conductor is provided with a conductor and/or dielectric screen formed of a composition comprising:
   (a) a crystalline polymeric composition having at least one sequence of either homopolymerised propylene or of propylene copolymerised with up to 10% by weight of the polymeric composition of at least one other olefin monomer, and at least a further sequence of propylene copolymerised with ethylene wherein said polymeric composition contains between 25 and 30% by weight of polymerised ethylene and has a melt flow index of between 0.01 and 0.5, and
   (b) 20-40% by weight, based on the total composition of conductive carbon black.

7. The electric conductor of claim 6 wherein the olefin monomer is ethylene.

References Cited
UNITED STATES PATENTS

| | | | |
|---|---|---|---|
| 3,358,056 | 12/1967 | Renaudo | 260—878 |
| 3,645,929 | 2/1972 | Normanton | 260—2.5 E |
| 3,617,377 | 11/1971 | Isshiki | 117—224 |
| 3,259,688 | 7/1966 | Towne | 117—232 |
| 3,256,366 | 6/1966 | Corbelli | 117—232 |
| 3,254,139 | 5/1966 | Anderson | 117—232 |
| 3,248,359 | 4/1966 | Maloney | 117—232 |
| 3,104,985 | 9/1963 | Williams | 117—232 |

LEON D. ROSDOL, Primary Examiner

M. F. ESPOSITO, Assistant Examiner

U.S. Cl. X.R.

117—201, 232; 156—51